Dec. 30, 1969  L. J. HEXEL  3,486,763
VEHICLE SUSPENSION
Filed Nov. 29, 1967  2 Sheets-Sheet 1
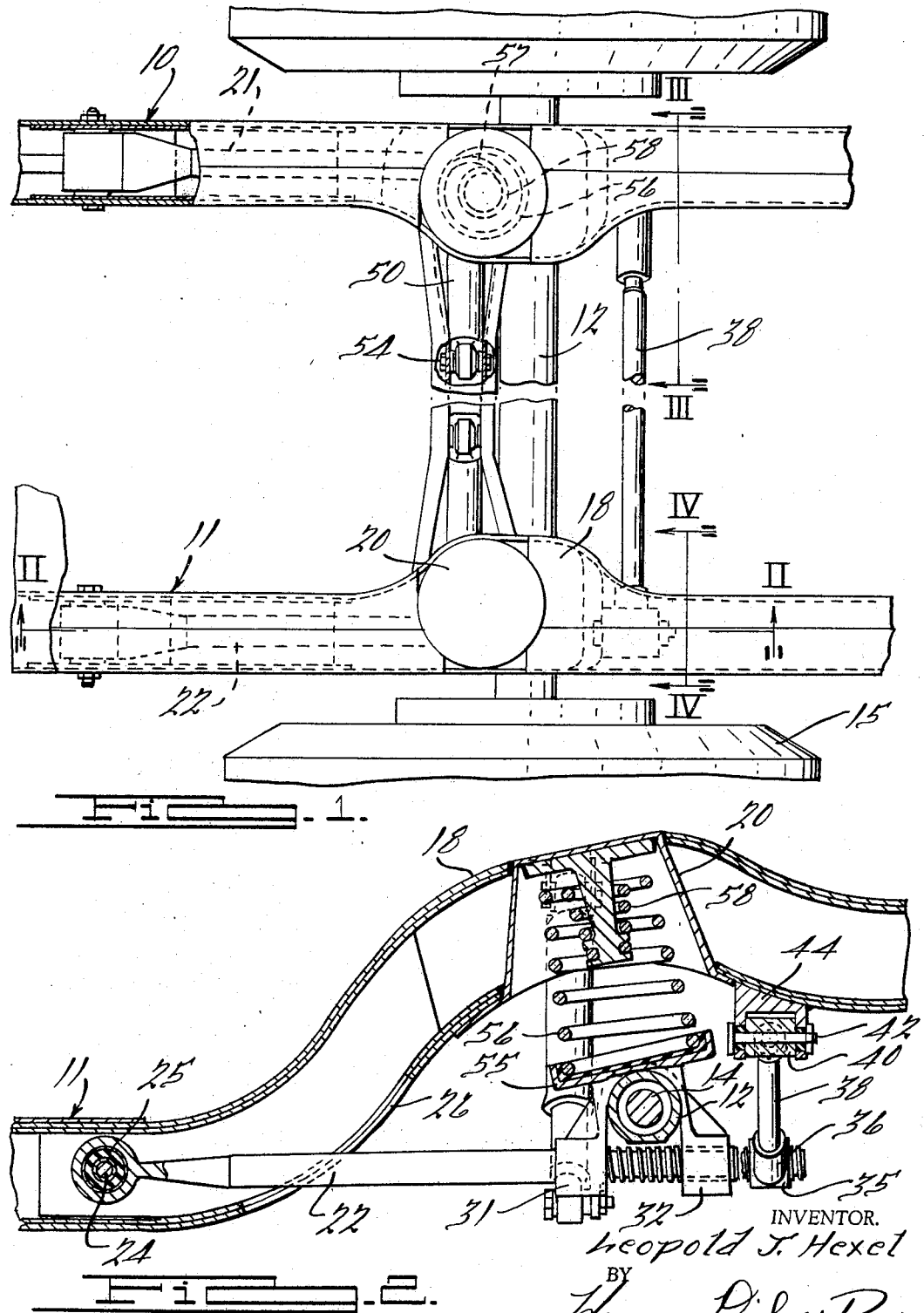
INVENTOR.
Leopold J. Hexel
BY
Harness, Dickey & Pierce.
ATTORNEYS.

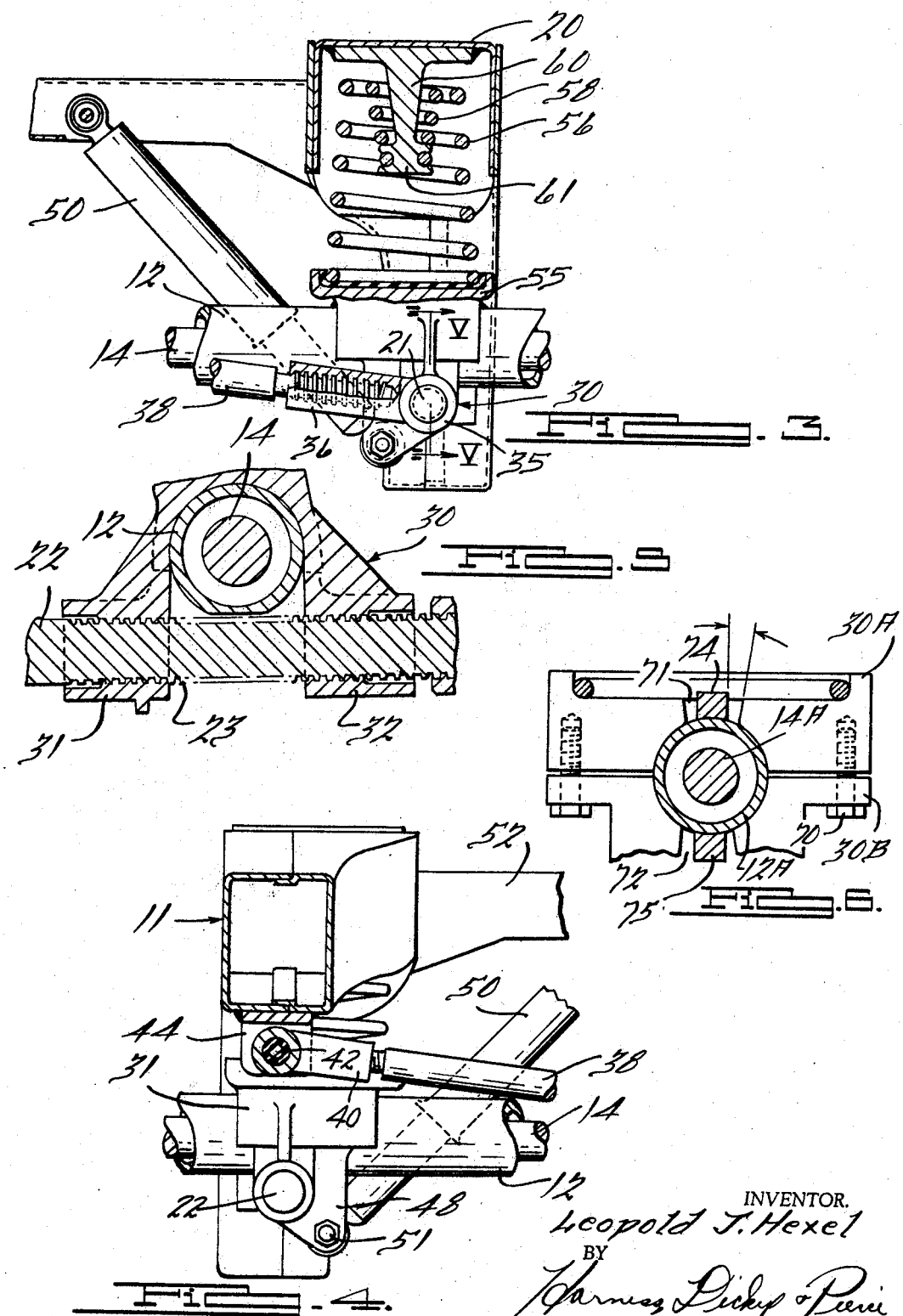

United States Patent Office 3,486,763
Patented Dec. 30, 1969

3,486,763
VEHICLE SUSPENSION
Leopold J. Hexel, 20164 Sheffield,
Detroit, Mich. 48221
Filed Nov. 29, 1967, Ser. No. 686,466
Int. Cl. B60g 3/14, 11/00
U.S. Cl. 280—124
9 Claims

ABSTRACT OF THE DISCLOSURE

Trailing control arms are pivoted at their forward extremities to the side rails of a chassis frame and the rear extremities of the control arms are attached to a driving axle housing by saddles which act as spring supports and as connectors. The suspension spring is located by a pad on the saddle and by an inverted cup in the axle kickup of the frame. The spring is formed of two interfitted and serially connected substantially helical sections which act as a single spring having concentric inner and outer parts. The free end of the internal section projects back into the larger external section. The reaction of the spring in one direction is exerted through a connection to the free end of its internal section, and in the other direction the spring reaction is exerted through the free end of the external section. When the spring is flexed compressively, its internal section acts in tension as the external section acts in compression. The spring rates of the two sections are subject to variation by modification of their wire size and the diameters of their convolutions. The control arms are connected at their rear ends to the saddles by threaded connections which permit independent adjustment on each side of the vehicle of the spacing between their points of connection to the axle and the fulcra of the arms. The threaded connections also permit independent springing movements of the ends of the axle without stressing the arms, pivots or fastening parts.

---

The purpose of this abstract is to enable the Patent Office and the public generally and especially the scientist, engineer or practitioner in the art who is not familiar with patent or legal terms or phraseology to determine quickly from a cursory inspection the nature and essence of the technical disclosure of the application. The abstract is neither intended to define the invention of the application nor is it intended to be limiting as to the scope of the invention in any way.

BRIEF SUMMARY OF THE INVENTION

The present invention has as its principal object the provision of an improved vehicle suspension which is more compact in a vertical direction and superior in its performance, in proportion to its overall installed cost, than presently known suspensions. An important object is to incorporate in such a suspension a multicoil interfitted spring which is short axially in proportion to its deflection and which enables reducing the extent to which load space is encroached upon by the frame kickups.

Another object is to provide an improved suspension of the trailing arm type which is easily adjustable during installation to accommodate variations in the dimensions of the frame and body such as occur in mass production of motor vehicles. Still another object is to provide such an improved suspension which requires only a single main control arm per wheel. A further object is to provide such a suspension which imposes virtually no resistance to independent vertical springing movements of wheel and/or axle portions on opposite sides of the vehicle. Still another object is to provide such a suspension which is low in its vertical height, simple, light in weight, but extremely rugged, and which is substantially relieved of stresses caused by springing movements.

Another object is to provide such an improved suspension system which provides an anti-sway effect without requiring special apparatus for this purpose.

Other objects and advantages will be apparent upon consideration of the present disclosure in its entirety.

BRIEF DESCRIPTION OF THE VIEWS OF THE DRAWING

FIGURE 1 is a plan view partly broken away of the chassis of a motor vehicle equipped with a suspension constructed in accordance with a preferred form of the invention;

FIGURES 2, 3 and 4 are sectional elevational views taken substantially as indicated by the lines and arrows II—II, III—III and IV—IV of FIGURE 1;

FIGURE 5 is a sectional detail taken substantially on the line V—V of FIGURE 3 and looking in the direction of the arrows; and FIGURE 6 is a view similar to FIGURE 5 showing a modification.

Referring now to the drawing, reference characters 10 and 11 designate respectively the right and left side rails of the chassis frame of a motor vehicle. In the preferred embodiments shown the vehicle is presumed to be of the front engine-rear drive type, although it will be seen that the invention is also applicable to other types of vehicles. Although a conventional chassis frame is shown, the same principles will readily apply to vehicles of the so-called "unit" construction, and to independent or axle suspensions. A transverse axle assembly is shown and is also illustrated as of a conventional type having an axle housing 12 and axle shafts 14 which drive the wheels 15. FIGURE 1 is centrally broken away, and the propeller shaft and the differential portions of the axle assembly are not shown. The terms "right," "left," "longitudinal" and "transverse" are used conventionally herein with reference to the vehicle.

The laterally widened axle kickup portions 18 of the frame carry inverted spring abutment cups 20 secured therein by welding. Wheel springing movements are controlled by a pair of trailing control arms 21, 22 which at their forward ends are pivoted in the frame on transverse pivot bolts 24, rubber bushings 25 being incorporated in such pivots. Each control arm extends through an opening 26 in the lower flange of the kickup section, and rearwardly to the wheel support, which is shown as a conventional driving axle. Each control arm extends beneath the axle housing 12, to which it is attached by a saddle 30.

Each saddle is preferably welded to the axle housing, in the embodiment of FIGS. 1–5, and is provided with front and rear depending coupling sections 31, 32, which are coaxially drilled and threaded, the internal threads thereof being helically colinear and adapted to threadedly receive and hold the correspondingly externally threaded rear extremity 23 of the control arm.

In the installation of the control arms, they are first threaded into the saddle sockets and are rotated until, with the axle in the proper position, their front ends are properly aligned with the holes for pivot bolts 24, whereafter the pivot bolts are installed. The threads thus permit a substantial range of adjustment to accommodate dimensional differences.

The right control arm 21 projects rearwardly beyond the rear saddle portion 32, and the head section of a T-shaped fitting 35 is threaded on the rearwardly projecting portion of the control arm. A laterally projecting socket portion 36 of T-fitting 35 is internally threaded to receive the externally threaded portion (undesignated) of a track bar 38. The left end of the track bar is pivoted for swinging movement about a longitudinal axis by means of another T-fitting 40 secured to the track bar and vertically swingable on a pivot bolt 42 supported in a bracket 44 rigidly attached to and depending from left frame rail 11.

Each of the front arm socket portions 31 of the saddles is provided with a downwardly and inwardly extending integral lug portion 48 to which a shock absorber assembly as 50 is pivotally connected by a pivot bolt 51. The upper end of each shock absorber assembly is pivotally connected to a frame cross member 52 by means of a pivot bolt 54. The action of the shock absorbers opposes torque on the axle housing because of the longitudinal spacing between the axle and the positions of attachment of the shock absorbers.

The top of each saddle 30 carries an integral dished spring socket 55 for coaction with the corresponding cup 20 to locate a main suspension spring. Each spring comprises a helical outer section 56 seated in and extending upwardly from the socket 55. The upper end of section 56 is connected only to a second helical section 58 which projects downwardly from the top of and within section 56. The inner section 58 is substantially coaxial with and of substantially smaller diameter than the outer section 56, and the upper ends of the two sections may be integral, being shown as formed of a single continuous piece of wire, having a substantially spiral portion 57 which interconnects the sections at the top, although as will be apparent the two sections could be formed separately and interconnected in any suitable manner. The upper spring abutment is attached only to the lower extremity of the inner section 58, such attachment being effected by means of a post 60 depending substantially centrally from the interior of the cup 20 and projecting part way through the convolutions of the outer section to a coupling portion 61 which is attached to the lower end of the inner section. As also indicated in the drawing, the convolutions of the spring sections may be of graduated diameter, to create desired variable rate characteristics, although this is a matter of preference depending upon the ride characteristics desired by the designer. The inner section is shorter than the outer section 56 and the sections are so designed that they reach their intended travel limits before the inner section bottoms against pad 55. The total possible spring travel is much greater in proportion to the length of the spring than is possible with a simple compression spring such as is conventionally used in vehicle suspensions. The axle kickup 18 may therefore be considerably lower in height than is necessitated with conventional coil springs, and loss of space within the load compartment due to the axle kickup is substantially reduced. The saving in vertical space is sufficient, for example, to permit the body designer to incorporate a third full-sized forwardly facing seat, with full head room, in a station wagon of sedan height built on a regular chassis. With current coil spring-type rear suspensions it has not been possible due to the axle kickup, to provide a front-facing third seat without adopting some undesirable alternative such as elevating the roof section over the third seat, lengthening the entire chassis, or elevating the entire roof, which would necessitate the adoption of special doors and other costly parts with resultant increase in cost to the consumer.

Since both control arms are restrained at their rear ends against rotation about the axle axis, and their front ends are positioned with respect to the frame rails, sway of the vehicle is opposed by torque transmitted through the axle housing.

In FIGURE 6 I have shown a modified saddle construction and adjacent axle housing parts, designed to permit limited rotation of the saddle around the axis of the axle shaft under high torque loadings. Where undesirably high torsional stresses might be applied to the axle housing-to-saddle fastenings, one of the saddles may be so connected to the axle housing as to permit limited and restrained rotation therebetween. In the construction shown, instead of being welded to the axle housing 12a, the saddle body is formed in two sections 30a and 30b secured together and frictionally clamped to the axle housing by the clamping screws 70. Sections 30a and 30b are provided with radial openings as 71, 72, and lugs 74, 75 rigidly attached to the axle housing project into the openings 71, 72 and are narrower than the openings in a peripheral direction, thereby permitting limited rotation (indicated as approximately 18°) between the two control arms and between the axle-to-control arm connections. The frictional resistance to such independent rotation is preferably high, and is adjustable by means of the clamping screws 70.

While it will be apparent that the preferred embodiments of the invention disclosed are well calculated to fulfill the objects above stated, it will be appreciated that the invention is susceptible to modification, variation and change.

What is claimed is:

1. In a vehicular wheel suspension including a wheel and a wheel support, a sprung frame structure, a longitudinal control arm pivoted at one end to the frame structure on a transverse axis and at the other end attached to the wheel support by means permitting relative pivotal movement between the arm and wheel support about a longitudinal axis but restricting rotation of the wheel support about a transverse axis, the novelty which comprises a duplex spring having serially connected sections interfitted with one another, one of said sections being loaded in compression and the other in tension and one reacting in one direction against the wheel support and the other in the opposite direction against the frame structure.

2. A suspension as defined in claim 1 wherein said spring comprises two generally helical sections including an outer section of greater radius and an inner section of lesser radius reentrantly projecting into the outer section from one end, the common ends of the two sections being mechanically connected to each other and spaced from both the frame structure and the wheel support, the free ends of said sections projecting in a common direction, and loadings being applied to said free ends whereby one section is loaded in tension when the other is loaded in compression.

3. A suspension as defined in claim 1 wherein said means permitting relative pivotal movement about a longitudinal axis includes threaded portions coaxial with the control arm and threadedly attaching the arm to the wheel support.

4. A suspension as defined in claim 1 wherein said means for attaching the control arm to the wheel support comprises a saddle bracket attached to the wheel support and having internally threaded longitudinal socket portions, the arm being threadedly interfitted with such socket portions.

5. The suspension as defined in claim 4 wherein the wheel support is an axle housing, and shock absorber fastening means carried by said saddle bracket are provided at a position spaced longitudinally from said axle housing.

6. A vehicular wheel suspension as defined in claim 1 wherein the wheel support is an axle housing and the frame structure includes a longitudinal side rail and a kickup portion bridging the axle housing, said arm being pivoted at one end to a side rail on a transverse axis longitudinally spaced from the axle housing, a saddle bracket attached to the axle housing, the other end of the arm being connected to the saddle bracket by threadedly interfitted portions coaxial with the arm, and said spring being interposed between said saddle bracket and the kickup portion.

7. In combination with means as defined in claim 6, shock absorber fastening means carried by the saddle bracket and longitudinally spaced from the axle housing.

8. In combination with means as defined in claim 7, a threaded portion of said arm projecting longitudinally from said axle housing, and a track bar threadedly connected to said projecting portion of the arm and extending transversely to a pivotal connection with said frame structure on a longitudinal axis.

9. In a vehicle suspension, a frame structure, a wheel support, and a suspension spring having two generally cylindrical coiled sections of variant diameter interfitted with each other and separately axially extensible and contractable, said sections being mechanically connected to eath other at a common end which is spaced from and free of both the frame structure and wheel support, the other end of one section being connected to the frame structure, and the other end of the other section being connected to the wheel support.

References Cited

UNITED STATES PATENTS

| 2,182,248 | 12/1939 | Chayne | 180—73 |
| 2,204,988 | 6/1940 | Haltenberger | 180—73 |
| 3,419,102 | 12/1968 | Sampietro | 180—73 |

FOREIGN PATENTS

| 623,183 | 7/1961 | Canada. |

A. HARRY LEVY, Primary Examiner

U.S. Cl. X.R.

180—71; 267—20, 61